United States Patent
Mizutani et al.

[11] Patent Number: 5,874,890
[45] Date of Patent: Feb. 23, 1999

[54] VEHICLE THEFT PREVENTION DEVICE

[75] Inventors: Manabu Mizutani, Toyota; Kouji Iwamoto, Higashikamo-gun; Masachika Kamiya, Toyota, all of Japan

[73] Assignee: Toyota Jidosha Kabushiki Kaisha, Toyota, Japan

[21] Appl. No.: 903,356

[22] Filed: Jul. 30, 1997

[30] Foreign Application Priority Data

Jul. 31, 1996 [JP] Japan .................................. 8-202006

[51] Int. Cl.$^6$ .................................................. B60R 25/10
[52] U.S. Cl. .................... 340/426; 340/428; 340/430; 307/10.2; 180/287
[58] Field of Search ..................... 340/426, 428, 340/430; 307/10.2, 10.3, 10.4, 10.5, 10.6; 180/287

[56] References Cited

U.S. PATENT DOCUMENTS

| | | | |
|---|---|---|---|
| 4,383,242 | 5/1983 | Sassover et al. | 307/10.5 |
| 4,754,255 | 6/1988 | Sanders et al. | 340/539 |
| 4,866,417 | 9/1989 | Defino et al. | 340/429 |
| 4,963,856 | 10/1990 | Yukitomo | 340/426 |
| 5,049,867 | 9/1991 | Stouffer | 340/426 |
| 5,285,186 | 2/1994 | Chen | 340/428 |
| 5,673,017 | 9/1997 | Dery et al. | 340/426 |
| 5,760,680 | 6/1998 | Hwang | 340/426 |
| 5,790,015 | 8/1998 | Iitsuka | 340/426 |

FOREIGN PATENT DOCUMENTS

| | | |
|---|---|---|
| 9311381.1 | 1/1994 | Germany . |
| 61-263856 | 11/1986 | Japan . |
| 4-159163 | 6/1992 | Japan . |
| 6-35062 | 5/1994 | Japan . |
| 2211552 | 7/1989 | United Kingdom . |

OTHER PUBLICATIONS

G. Huber et al., The New Mercedes–Benz Roadster–Car Body: Climate Control, Soft Top and Locking System, ATZ Automobiltechnische Zeitschrift, 1989.

*Primary Examiner*—Jeffery A. Hofsass
*Assistant Examiner*—Ashok Mannava
*Attorney, Agent, or Firm*—Pillsbury Madison & Sutro

[57] ABSTRACT

An alarm operation is activated by closing all vehicle doors (S11). When all doors are locked (S12), an active alarm awaiting state is set (S13) and, when all doors are not locked (S12), a passive alarm awaiting state is set (S16). When all the doors are locked after a passive alarm awaiting state was set (S17), the passive alarm awaiting state shifts to an active alarm awaiting state. Then, whether or not all doors are unlocked is judged (S14). If they are unlocked, the alarm awaiting state is released (S15). If the alarm mode is preserved intact, without shifting to be in an active alarm mode, the alarm awaiting state is released (S15) by turning on an ignition or accessory switch within fifteen seconds after a door was opened (S18).

9 Claims, 2 Drawing Sheets

VEHICLE THEFT PREVENTION DEVICE

BACKGROUND OF THE INVENTION

1. Field of the Invention

The present invention relates to a vehicle theft prevention device which signals an alarm in response to a predetermined action performed to a vehicle when the device equipped to the vehicle is in an alarm awaiting state. In particular, an alarm awaiting state can be set and released in a plurality of modes in this device.

2. Description of the Related Art

Conventionally, many devices have been proposed to prevent vehicle thefts, including one which raises various alarms in response to unauthorized actions performed to the vehicle such as unauthorized opening of doors. For such vehicle theft prevention devices, authorized operations must be discriminated from unauthorized operations.

For such discrimination, two methods are known, an active alarm mode and a passive alarm mode. In the active alarm mode, an alarm awaiting state is set by locking all the doors after an ignition key was pulled out, and released by authorized unlocking the doors. If unauthorized operations are made to a vehicle while the device is set in an alarm awaiting state, the device signals an alarm. With this method, an alarm will be signaled if a door, etc., is forcibly opened when locked.

In the passive alarm mode, on the other hand, closing all the doors initiates an alarm awaiting state, and such a state is released by operating an ignition key within a predetermined period of time after a door was opened. If an ignition key is not operated within a predetermined period of time after a door was opened, an alarm will be raised. With this method, an alarm will be given if a door is opened by someone who does not have ignition key.

Note that the above devices are disclosed in U.S. Pat. No. 4,383,242.

In the active alarm mode, an alarm awaiting state is initiated by locking all the doors and released by unlocking them, as mentioned above. Because an authorized user having a key does not forcibly open the door, the active alarm mode is advantageous in that the discrimination can be highly accurate. However, it has such a problem that no alarm will be raised if any of the doors were left unlocked.

In the passive alarm mode, an alarm awaiting state is instantly set when the user simply exists the vehicle and closes the doors. However, an alarm may possibly be activated also in response to an operation by an authorized user. That is, if a user first closes all the doors and again opens a door to get something left inside, an alarm will be raised in a predetermined period of time.

SUMMARY OF THE INVENTION

The present invention have been conceived to overcome the above problems and aims to provide a vehicle theft prevention device which more effectively signals alarms.

In the present invention, there is provided a vehicle theft prevention device which raises an alarm when a predetermined action is performed to a vehicle with the device set in an alarm awaiting state, comprising a first alarm mode in which the alarm awaiting state is set under a first set condition and released under a first release condition which corresponds to the first set condition; and a second alarm mode in which the alarm awaiting state is set under a second set condition and released under a second release condition which corresponds to the second set condition; wherein, when the second set condition is met after an alarm awaiting state was set in the first alarm mode, the alarm awaiting state set in the first alarm awaiting mode shifts to be in the second alarm mode so that the alarm awaiting mode is released under the second release condition.

As described above, the device of the present invention includes two different alarm modes which are set or released under two different conditions, and can raise an alarm in either mode. With this arrangement, the device can signal an alarm in response to a plurality of situations. In addition, in the case that an alarm awaiting state is set in the first alarm mode under the first set condition and the second set condition is met thereafter, the alarm awaiting state set in the first alarm mode shifts to the second alarm mode, so that the alarm awaiting state will be released under the second release condition. That is, the second alarm mode is set prior to the first alarm mode so that the alarm awaiting state can be released under the second release condition. With this arrangement, an alarm can be more effectively raised by applying the second release condition as a more reliable release condition.

In another aspect of the present invention, the device includes a first alarm mode in which an alarm awaiting state is set by closing all the doors and released by operating an ignition key within a predetermined period of time after a door was opened, and a second alarm mode in which an alarm awaiting state is set by locking all the doors and released by unlocking a door. When an alarm awaiting state is set in the first alarm mode by closing all the doors and all the doors are locked thereafter, the alarm awaiting state set in the first alarm mode shifts to the second alarm mode, so that the alarm awaiting state is released by unlocking a door.

As described above, an alarm awaiting state will be set simply by closing all the doors, even without locking them. The mode of the alarm awaiting state then set is the first alarm mode. That is, an alarm can be raised even when the doors are left unlocked if any unauthorized operation is performed to the vehicle. On the other hand, when all the doors are locked, an alarm awaiting state is set in the second alarm mode, which is released by unlocking a door.

In the first alarm mode, which is released by operating an ignition key within a predetermined period of time after a door was opened, an unnecessary alarm may be raised in response to even an authorized operation if this operation does not meet the above release condition.

In order to avoid such unnecessary alarming, in the present invention, an alarm awaiting state shifts from in the first alarm mode to be in the second alarm mode when all the doors are locked. With this arrangement, even if an alarm awaiting state is once set in the first alarm mode, it will be released under the second release condition, i.e., unlocking door, which is a more reliable relase condition. As a result, unnecessary alarming will be less frequent, which contributes to achieving more effective setting and releasing an alarm state.

BRIEF DESCRIPTION OF THE DRAWINGS

The above and the other objects, features, and advantages, will become further apparent from the following description of the preferred embodiment taken in conjunction with the accompanying drawings wherein.

DESCRIPTION OF THE PREFERRED EMBODIMENTS

Figure 1:
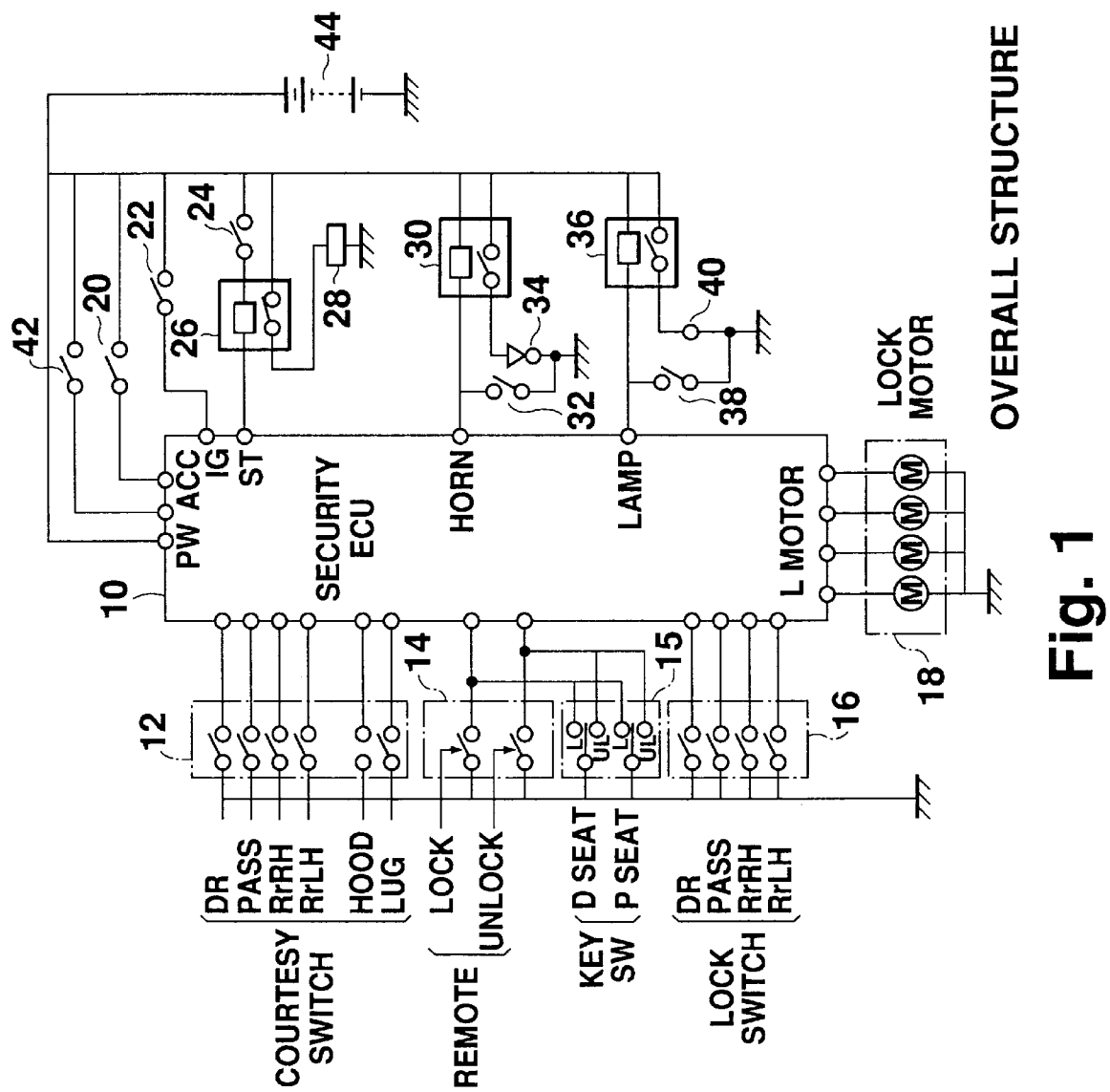
FIG. 1 is a diagram showing the entire structure of a vehicle theft prevention device of the present invention.

In the following, preferred embodiments of the present invention (hereinafter referred to as an embodiment) will be described based on the accompanying drawings. FIG. 1 is a diagram showing the entire structure of a device according to an embodiment. In this structure, a security ECU 10 controls activation of an alarm, such as a horn or a lamp, referring to the states of various input signals.

Courtesy switches 12 comprise six independent switches relative to a driver seat DR, a passenger seat PASS, a rear right seat RrRH, a rear left seat RrLH, a hood (bonnet) HOOD, and a luggage (trunk) LUG, respectively. These switches are switched on/off by opening/closing the respective four doors, the bonnet, and the trunk, and outputs signals indicating the on/off states (an on/off state signal) of the respective switches to the security ECU 10.

Remote lock switches 14, comprising a lock switch and an unlock switch, are switched on/off in response to a remote lock/unlock signal supplied from a remote controller (not shown). These switches supply signals indicating their on/off command to the security ECU 10.

Key SW 15 are operated in response to locking/unlocking doors using a key (a key operation) inserted into key cylinders each equipped to a driver seat door (a D seat) or a passenger seat door (a P seat). To be specific, the lock or unlock terminal of each of the D and P seat keys is grounded according to a key operation. Key SW 15 supply signals indicating their on/off command to the security ECU 10.

Referring to the on/off state signals from the remote switches 14 and the key SW 15, the security ECU 10 acknowledges a command issued from a remote controller in a key-less entry system (a remote lock/unlock signal or a command issued according to a key operation, the command instructing to lock/unlock doors (a lock/unlock command). In this embodiment, all vehicle doors are opened/closed according to the above command. However, it is also possible to lock/unlock only a particular door, a trunk, etc., by means of remote control.

As lock switches 16 are turned on/off according to a manual locking/unlocking operation of door lock knobs, they resultantly detect whether respective door lock knobs on a driver seat DR door, a passenger seat PASS door a rear right seat RrRH door, and a rear left seat RrLH door, are situated in a locked or unlocked position. Based on the detected result, these switches supply a signal indicating their on/off state to the security ECU 10.

Lock motors 18 are controlled by the security ECU 10 to lock/unlock the respective four doors, namely, a driver seat DR door, a passenger seat PASS door, a rear right seat RrRF door, and a rear left seat RrLH. To be specific, the security ECU 10 drives the lock motors 18 to lock/unlock all of the doors in response to a signal instructing door lock/unlock, this signal being issued according to the operation of the remote lock switches 14 or the key SW 15. It should be noted that the remote lock switches 14 and key SW 15 are brought into the state instructed by a command issued from a remote controller or according to a key operation, and kept thus only for a predetermined period of time. The security ECU 10 controls the lock motors 18 in response to this effective state of the remote lock switches 14 and the key SW 15.

Also, the security ECU 10 may drive a corresponding lock motor/lock motors 18 in response to an on/off state signal outputted from the lock switches 16, so as to lock/unlock a door. Alternatively, it may be structured such that all the doors will be locked/unlocked in response to the operation of a lock switch 16 for a driver seat DR door.

An accessory switch 20 and an ignition switch 22 are turned on/off by operating an ignition key, and information regarding the on/off state of these switches is supplied to the security ECU 10. A starter switch 24, also operated by the ignition key, is connected to the security ECU 10 via a starter relay 26, which is also connected to a starter 28.

With this arrangement, the on/off state of the starter switch 24 is informed to the security ECU 10, and the starter 28 is driven via the starter relay 26 when the starter switch 24 is turned on. The terminal ST of the security ECU 10 to which the starter relay 26 is connected is generally set at an L level so that the starter relay 26 receives electric current when the starter switch 24 is turned on. If the security ECU 10 sets the terminal ST at an H level, the starter relay 26 will not receive electric current, even though the starter switch 24 is turned on. In short, the security ECU 10 can prohibit driving the starter 28 by setting the terminal ST at an H level.

A horn relay 30 is connected on its coil side to the terminal HORN of the security ECU 10. This terminal HORN is generally set at an H level so that the horn relay 30 normally remains turned-off. The connecting part between the horn relay 30 and the terminal HORN is grounded via a manually operated horn switch 32, and the horn relay 30 is also grounded on its switch side via a horn 34.

With this arrangement, when the horn switch 32 is turned on, the horn relay 30 is resultantly turned on, causing the horn 34 to sound. In addition, when the security ECU 10 sets the terminal HORN at an L level, the horn relay 30 is resultantly turned on, causing the horn 34 to sound.

A lamp relay 36 is connected on its coil side to the terminal LAMP of the security ECU 10. This terminal LAMP is generally set at an H level so that the lamp relay 36 normally remains turned-off. The connecting part between the lamp relay 36 and the terminal HORN is grounded via a manually operated lamp switch 38, and the lamp relay 30 is grounded on its switch side via a lamp 40.

With this arrangement, when the lamp switch 38 is turned on, the lamp relay 36 is resultantly turned on, causing the lamp 40 to light.

In addition, when the security ECU 10 sets the terminal LAMP at an L level, the lamp relay 36 is turned on, causing the lamp 40 to light.

A key insertion switch 42 is turned on/off depending on whether or not an ignition key is inserted into an ignition key cylinder. In other words, the security ECU 10 detects whether or not an ignition key is in the ignition key cylinder by referring to the on/off state of the key insertion switch 42.

The respective sections of the device are powered by a battery 44.

Setting and Releasing an Alarm Awaiting State

Figure 2:
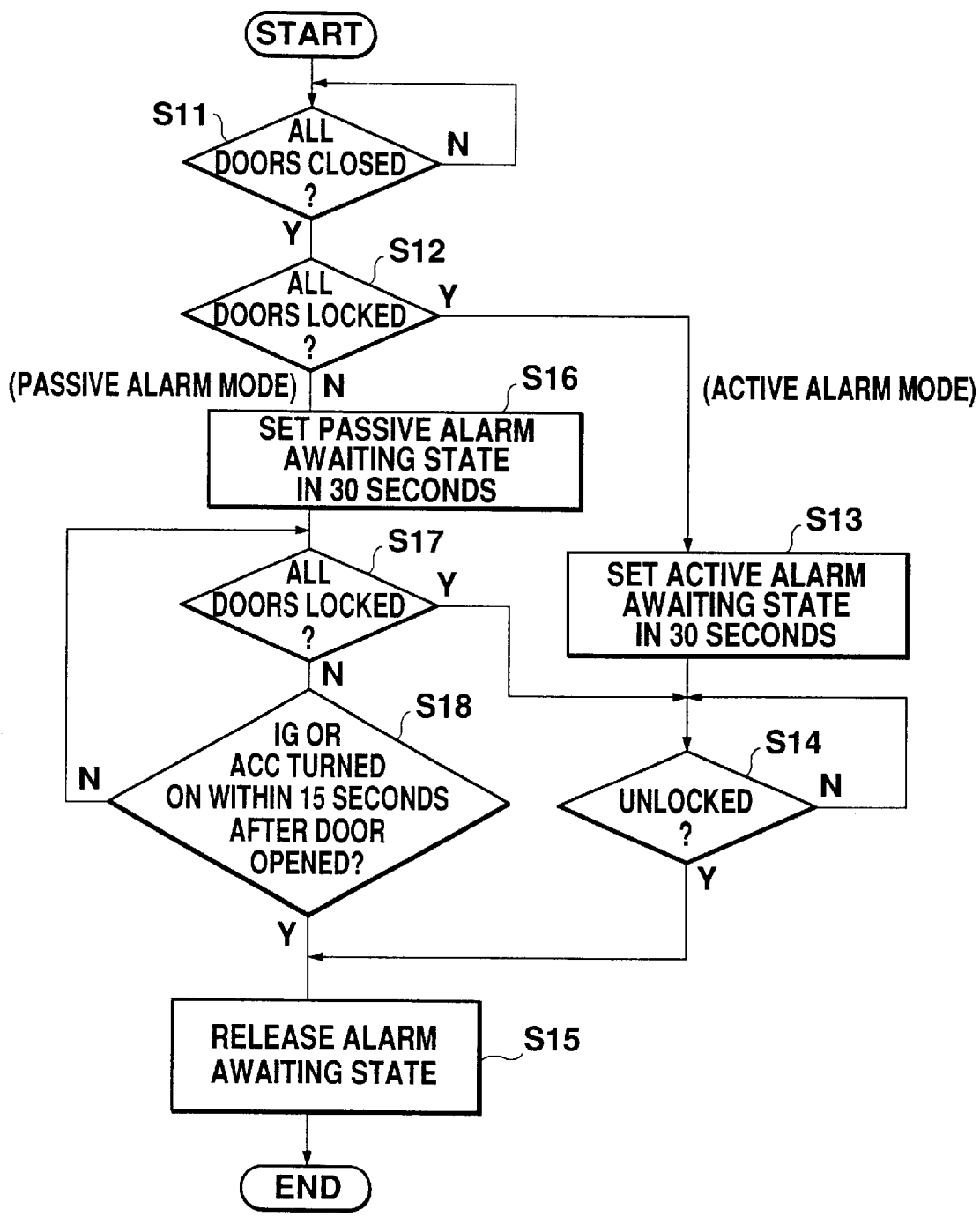
FIG. 2 is a flowchart showing a process for setting or releasing an alarm awaiting state in the present invention.

The device of the embodiment controls setting or releasing an alarm awaiting state according to the state of an input signal. This will be described referring to the flowchart of FIG. 2. If any unauthorized operation is made to a vehicle while the device equipped to the vehicle is in an alarm awaiting state, an alarming operation is activated such that the starter 28 is disabled from being driven, the horn 34 sounds, or the lamp 40 lights.

In order to set an alarm awaiting state, it is initially judged whether or not all the doors are closed with an ignition key not inserted into a key cylinder (S11). This judgment is made based on the state of the curtain switches 12. With all the doors closed, it is then judged, based on the state of the lock switches 16, whether or not all the doors are locked (S12). If all doors are locked, an alarm awaiting state (an alarm state) is set in thirty seconds (S13). In this event, an alarm awaiting state is set in an active alarm mode.

Subsequently, to release the alarm awaiting state, it is judged whether or not all the doors are unlocked in response to a signal signals instructing to unlock doors issued by the remote lock switches 14 having received a signal from a remote controller, or the keys SE 15 according to an authorized key operation (S14). If all the doors are judged to have been unlocked at S14, an alarm awaiting state is released (S15). Note that, in a keyless entry system, a remote unlock command (a door-lock off command) is transmitted from a remote controller via radio, so that all the doors will be unlocked in response to this unlock signal. In unlocking doors by a key operation, any of the doors may cause releasing the alarm wating state. However, it is also possible, and actually preferable, that unlocking a driver seat DR door is solely allowed to release an alarm awaiting state. Note that unlocking the driver seat DR door generally causes unlocking of all other doors.

After all the doors are locked by means of a keyless entry or a key operation as described above, an alarm awaiting state is set in thirty seconds. The alarm awaiting state is then released after the doors are unlocked by those means. In this manner, an alarm awaiting state is set or released in an active alarm mode, and maintained during the entire period when the doors are kept locked so that an alarm will be raised in response to an authorized operation carried out during such a period.

Returning to S12, even if all the doors are not locked, an alarm awaiting state is also set in thirty seconds (S16). In this time, it is set in a passive mode. After an alarm awaiting state is thus set, whether or not all the doors are locked is again judged (S17). In a case where any of the doors is judged unlocked at S17, it is then judged whether or not a door was opened again and either an accessory switch 20 or an ignition switch 22 was turned on after the opening of the door (S18). If this judgment turns out negative, the process returns to S17, where whether or not all the doors are locked is judged. With a positive judgment result obtained in S18, the process proceeds to S15, where the alarm awaiting state is released.

As described above, when any of the doors is left unlocked and this fact is detected at S12, an alarm awaiting state is set thirty seconds after all the doors were closed, and maintained until a door is opened again and either an accessory switch 20 or an ignition switch 22 is turned on fifteen seconds after opening of the door. In this way, an alarm awaiting state is set or released in a passive mode.

If it is judged positive at S17, that is, all the doors are locked after an alarm awaiting state was set in a passive alarm mode, the process proceeds to S14, where judgment will be made to unlock the doors. That is, an alarm awaiting state will be released by door unlocking. In other words, if all the doors are locked in a passive alarm awaiting state, the alarm mode shifts to an active mode, so that judgment will be made as to whether or not required conditions to release an active alarm awaiting state is met.

To be more specific, in a case where all the doors are locked after an alarm awaiting system was set in a passive mode because a user got off the vehicle with all the doors unlocked, unlocking doors will be a required condition to release an alarm awaiting state. With this arrangement, erroneous judgment as to a release condition in a passive alarm awaiting state, which is often made, can be avoided.

On the other hand, if all the doors are not locked in the above case, the alarm awaiting state is preserved in a passive mode so that an alarm will be raised when an unauthorized operation is carried out to the vehicle even though the doors are unlocked.

Alarm Arising

In an active alarm awaiting state, with the following conditions met, the following alarms will be activated.

Conditions
- (i) Doors are unlocked by any ways other than using a remote controller or according to a key operation.
- (ii) Doors, a bonnet (hood), and/or a trunk (luggage) are opened.
- (iii) An ignition or accessory switch is turned on with no key inserted into an ignition key cylinder (an on signal of an ignition or accessory switch is detected with no key inserted in an ignition key cylinder.)

Alarms
- (i) Doors are forcibly locked.
- (ii) A vehicle security horn sounds (in this example, the vehicle is provided with a security horn).
- (iii) A head/tail light lights.
- (iv) A starter is cut off.

In a passive alarm awaiting state, with the following conditions met, the following alarms will be activated.

Conditions
- (i) An ignition is not turned on in fifteen seconds after a door, a bonnet, or a trunk was opened.
- (ii) An ignition or accessory switch is turned on with no key placed in an ignition key cylinder (an on signal of an ignition or accessory switch is detected with no key inserted in an ignition key cylinder)
- (iii) A battery is re-connected.

If an alarm mode is desired to be fixed to either an active or passive mode, it may be structured to be thus fixed using a switch operation, and so forth.

Alarms
- (i) A vehicle security horn sounds (in this example, the vehicle is provided with a security horn).
- (ii) A head/tail light lights.
- (iii) A starter is cut off.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A vehicle theft prevention device
    which raises an alarm when a predetermined action is performed with the device set in an alarm waiting state, comprising:
        a first alarm mode in which an alarm awaiting state is set under a first set condition and released under a first release condition; and
        a second alarm mode in which an alarm awaiting state is set under a second set condition and released under a second release condition;
    wherein
        the first set condition is at least that an ignition key is not inserted into a key cylinder, all doors are closed, and any door is left unlocked; and
        the second set condition is at least that an ignition key is not inserted into a key cylinder, all doors are closed, and all doors are locked.

2. A vehicle theft prevention device as defined in claim 1, wherein,
    the alarm awaiting state is set in a predetermined period of time after either the first set condition or the second set condition was met.

3. A vehicle theft prevention device as defined in claim 1, wherein, the first release condition is that an ignition key is operated within a predetermined period of time after at least one door was opened; and the second release condition is that at least one door is unlocked.

4. A vehicle theft prevention device as defined in claim 1, wherein, the alarm awaiting state set in the first alarm mode shifts to be in the second alarm mode after all the doors were locked.

5. The device of claim 1, wherein the first alarm mode is a passive alarm mode.

6. The device of claim 1, wherein the second alarm mode is an active alarm mode.

7. The device of claim 1, wherein the first set condition is at least that the ignition key is not actuated, all doors are closed and a door is unlocked.

8. The device of claim 1, wherein the second set condition is at least that an ignition key is not actuated, all doors are closed, and all doors are locked.

9. The device of claim 1, wherein the system switches to the second set condition when the second set condition is met while the system is in the first awaiting mode.

* * * * *